Arthur E. Bishop

Dec. 23, 1958 A. E. BISHOP 2,865,215
POWER STEERING GEAR
Filed Jan. 3, 1955 4 Sheets-Sheet 4

Inventor
Arthur E. Bishop
By Hill, Sherman, Meroni, Gross & Simpson Attys

2,865,215

POWER STEERING GEAR

Arthur E. Bishop, Chatswood, near Sydney,
New South Wales, Australia

Application January 3, 1955, Serial No. 479,590

19 Claims. (Cl. 74—388)

The present invention relates to power steering apparatus and is more particularly concerned with the construction of a new and improved power steering system for automotive vehicles.

With the advent of extremely low pressure automobile tires, and the popularity of power assists in general, automotive power steering has recently become a very popular accessory. The presently manufactured power steering systems for automobiles vary in several respects but in spite of the numerous variations to be found in the systems commercially manufactured, none of the presently known systems provide optimum power steering. The present invention seeks to provide a greatly improved system by reducing the total effort required in steering and at the same time overcoming the recognized serious deficiencies in control of the vehicle at high speed attributable to the presently known prior art systems.

The first improvement is the introduction of a variable ratio device which more nearly meets the conflicting requirements of control during high speed highway driving and optimum ease of parking. When automobiles were initially constructed in the United States their steering systems were quite direct. Thus, in the earlier automobiles it required only about two or three turns of the steering wheel to go from an extreme left to an extreme right turn, ordinarily termed from lock to lock positions. These direct or low steering ratios were possible because of extremely high pressure tires and the positioning of only a small proportion of the total vehicle weight on the front tires. However, in the early 1930's balloon tires with relatively much lower pressures were developed and the weight distribution modified so that the steering loads were materially increased. In order to permit manual steering under such circumstances it was necessary to increase the steering ratio until with heavier vehicles the manual steering gear ratios approximated four turns of the steering wheel from lock to lock. This need for higher steering ratios has increased again with the advent of the supercushion or superballoon extremely low pressure tire in recent years.

In view of the increased steering loads it became desirable to provide power steering systems and it was suggested that as long as a motor of some sort was to supply the necessary steering effort, it would be desirable to return to a more direct steering and thereby avoid the large amount of turning of the steering wheel during cornering. Such an arrangement was incorporated, in fact, in at least one commercially manufactured automobile. However, it became apparent that such a steering system, while very convenient in parking the vehicle when the wheels are to be turned from lock to lock in relatively rapid sequence, was unsatisfactory since the average driver did not readily become adapted to the high degree of turn at high speeds on the highway. The average person, instead, had a definite tendency to oversteer the vehicle and at high speeds this is a substantial problem.

As a result of the difficulty in adapting to direct steering with power, most automotive manufacturers have retained the old manual steering ratios, considering the large number of steering wheel turns required to park the vehicle as the lesser of two evils. The present invention, on the other hand, has provided a steering system whereby relatively indirect steering is provided in the straight ahead position and relatively direct steering is provided as the wheels become turned more and more. Thus, in straight ahead position, the steering system of the present invention operates at substantially the same ratio as employed in the average manual steering system but as the vehicle wheels are turned more sharply the steering ratio becomes more direct. The result of this is that fewer turns of the steering wheel are required from lock to lock, thereby easing the job in parking but at the same time the average highway driving range of steering takes place at about the same steering ratio as heretofore employed in manual systems.

Although in accordance with the present invention, the steering ratio varies, the application of the power is substantially constant irrespective of the amount of wheel turn at any given instant. As a result of this construction, the power cylinder may be constructed with a minimum stroke, adapted to provide the necessary piston travel for the steering system at its extreme steering positions at the relatively direct steering ratio, thereby negating the need for extended piston travel in the relative indirect or high steering ratio situation.

In accomplishing the above desirable functions, the present invention employs a rotatable radially slotted element engaging an offset or eccentric pin secured to the pitman arm. Thus, the conventional worm wheel or steerable worm follower is rotatably mounted on a shaft preferably parallel to but not coaxial with the pitman arm shaft. The worm wheel is provided with a radial slot which cooperates with a pin secured to an arm extending radially from the pitman arm shaft. In the straight ahead position, the slot and the pin are positioned on the opposite side of the worm wheel axis from the axis of the pitman shaft and the parts are positioned such that a line drawn along the center of the slot will pass through both the axis of the worm wheel and the axis of the pitman shaft. As a result of this arrangement rotation of the worm wheel at or adjacent the in line steering condition will cause relatively slow rotation of the pitman shaft but as the degree of rotation of the pitman shaft increases, the effective angular rotation of the pitman shaft relative to the angular rotation of the worm wheel will increase. Power is applied in this system to the pitman shaft, thereby rendering the application of power independent of the variable pin and slot linkage.

Another important defect in prior art systems lies in the feel-back provided. All present commercial power steering systems incorporate some method for indicating to the vehicle driver the extent of the steering load. Accordingly, all power steering systems of commercial significance require the vehicle driver to add a portion of the steering effort to the steering operation. In the prior systems it has been considered important in the construction of power steering devices to have a direct proportionality between steering wheel input and total output forces. This proportionality may, in one class of devices, apply for all steering loads or, in another type of device, apply only to loads above a predetermined steering wheel input load commonly referred to as the threshold load. This proportionality has been achieved in the previous systems by the use of hydraulic balance areas commonly employed in hydraulic servo mechanisms.

However, hazardous conditions in driving often involve relatively small cornering, or output, forces. With systems in which no threshold load is used input loads corresponding to these small output forces are so small as to render significant changes in output loads practically indiscernible to the ordinary driver. In the alternative system in which a threshold load is used the driver encounters an undesirable, abrupt, change in feel in the ordinary range or output forces.

The present invention makes a distinction between a critical range involving high or medium speed cornering requiring relatively small output torques and a non-critical range dealing with intersection turns and parking maneuvers. The power assistance is zero for only very small input loads and gradually and smoothly increases at a substantial rate through the critical range. In the noncritical range, however, there is only slight additional increase of input load with increased output force requirements.

It is, therefore, an object of the present invention to provide an improved variable ratio power steering system.

Another object of the invention is to provide a power steering system for automotive vehicles wherein the power boost supplies a smoothly increasing amount of torque with increased steering load.

Yet another object of the present invention is to provide a power steering apparatus having a relatively high steering ratio in and adjacent to the straight ahead position and a relatively low steering ratio adjacent the extremities of turn.

Yet another object of the present invention is to provide a power steering system wherein the power steering valve is constructed to provide a gradual build up of power cylinder pressure with a gradually increasing steering load.

Still a further object of the present invention is to provide an extremely compact and reliable power steering system.

A feature of the invention resides in the provision of the reciprocating spool valve having non-planar, co-acting valve lands whereby pressure build up is caused to develop at a gradual rate.

Another feature of the invention resides in the provision of a pin and slot connection between the steering wheel and the steering wheel output shaft to provide a variable steering ratio.

Yet a further feature of the invention resides in the construction of a pin and slot variable ratio steering gear wherein power is applied to the steered wheel end of the steering linkage whereby substantially no variation in the application of power to the steered linkage occurs.

Yet another object of the invention is to provide a power steering system having a steering shaft with resilient axial restraint having no slack or lost motion in valve operation.

Still a further object of the present invention is to provide a novel power steering valve and bearing construction.

A feature of the improved valve of the invention is the provision of a pre-loaded steering shaft bearing system.

Still other and further objects and features of the present invention will at once become apparent to those skilled in the art from a consideration of the attached sheets of drawings wherein several embodiments of the invention are shown by way of illustration only and wherein.

As shown on the drawings.

Figures 1, 3:
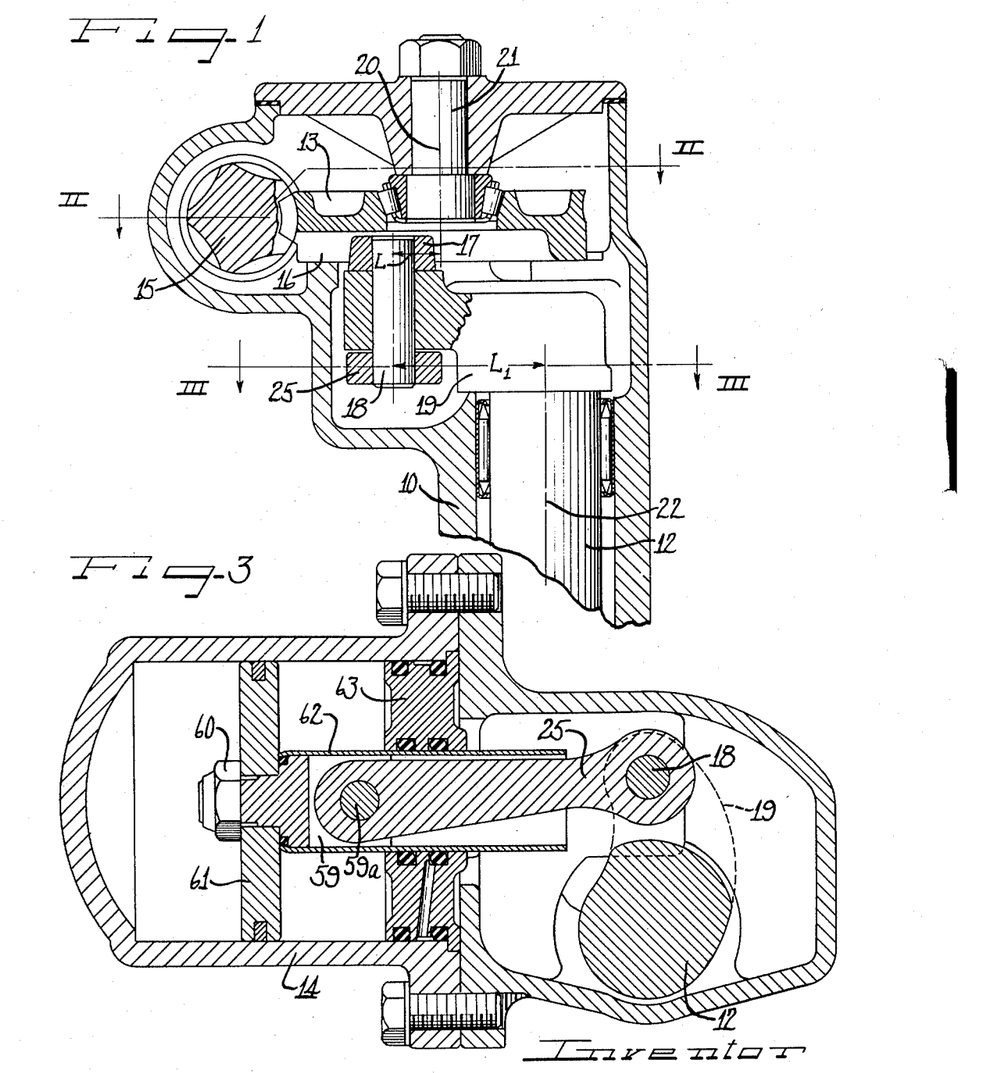
Figure 1 is a side elevational view in cross-section of a steering column gear box incorporating the present invention.
Figure 3 is still a further cross-sectional view of the steering gear of the present invention taken along the line III—III of Figure 1 and illustrating the power motor application to the steering system.
Figure 2:
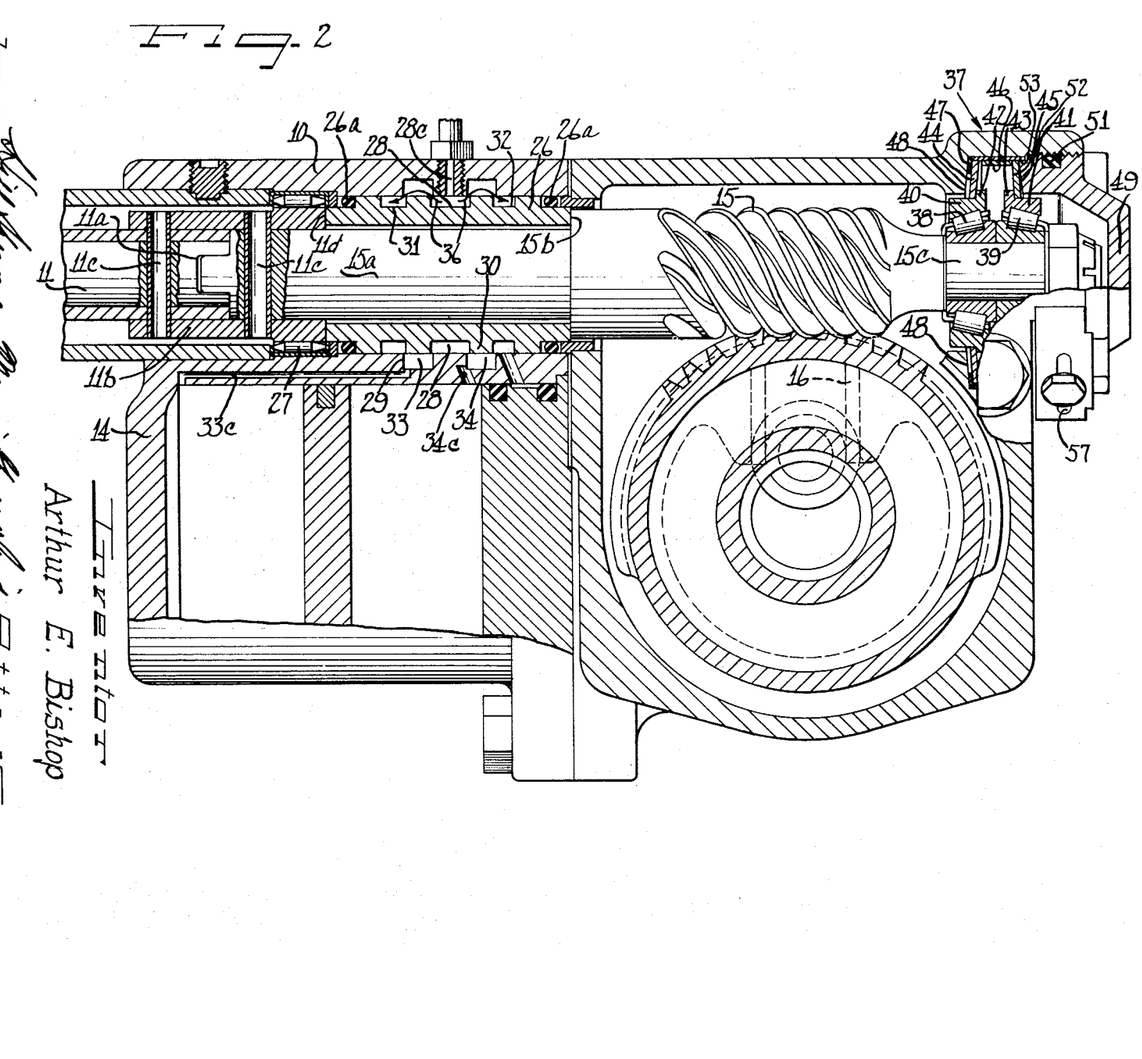
Figure 2 is a cross-sectional view of the steering gear of the present invention taken along the line II—II of Figure 1.

As may be seen from a consideration of Figures 1, 2 and 3, the power steering apparatus of the present invention is housed within a generally conventionally shaped housing 10 which supports a steering wheel shaft 11, pitman shaft 12 and worm wheel 13. For compactness, the power cylinder, preferably of the hydraulic type, utilized with the structure of the present invention is positioned with its axis generally parallel to the steering wheel shaft 11, as indicated at 14.

Steering motion is transferred from the shaft 11 to the pitman shaft 12 by a variable ratio device shown in detail in Figures 1 and 2. As may there be seen, the worm wheel 13 cooperates with the worm 15 and is rotated thereby. The worm wheel 13 is provided with a radial slot 16 in which a roller 17 mounted on a pin 18 is positioned. The pin 18 is in turn mounted radially of the pitman shaft 12 on a crank arm 19 whereby movement of the pin 18 causes the rotation of the shaft 12.

The pin and slot connection between the worm wheel 13 and the pitman shaft 12 provides a variable ratio. This may be understood from a consideration of Figure 1 wherein it may be seen that the axis 20 of the worm wheel supporting stub shaft 21 is parallel to the axis 22 of the shaft 12, but laterally spaced therefrom. In the vehicle straight ahead position, the pin 18, likewise having an axis parallel to the shaft 12, assumes a position as shown in Figure 1 on the opposite side of the axis 20 from the shaft 12. This arrangement provides a lever arm L between the worm wheel 13 and the pin 18 and the lever arm $L_1$ between the pin 18 and the shaft 12 giving a steering ratio for that portion of the linkage of $$\frac{L_1}{1}$$

However, with rotation of the worm wheel 13 the pin 18 is constrained to move in a circular path of radius $L_1$. Since the worm wheel 13 is rotating about a different axis, positioned between the pin 18 and the axis of the shaft 12, the distance L will increase as the parts move out of the straight ahead position shown in Figure 1. This change in the lever arm L provides a decreasing steering ratio, or in other words a more direct steering control as the pitman shaft gets further and further away from the direct straight ahead position. This relationship is illustrated in the chart shown in Figure 4 of my previous United States Patent No. 2,508,057, issued May 16, 1950.

In view of the decrease in steering ratio occasioned by the linkage above discussed, a relatively indirect steering control is provided in the straight ahead position and relatively direct control of the steering is provided at the extremes of turning. Additionally, the number of turns required to turn the steering wheel from lock to lock is substantially reduced since at the ends of the travel of the pitman shaft the ratio between L and $L_1$ practically approaches 1 to 1 thereby providing substantially greater than normal turn to the pitman shaft 12 per degree of turn of the worm wheel 13 and hence steering shaft 11.

In automotive power steering systems it is essential that the smallest possible amount of space be utilized and, further, that power be applied evenly to the steering linkage. Although variable power application has merit in controlling castoring wheel instability and shimmy in systems such as aircraft steering, in automotive use power is not applied with a variable ratio as only force requirements are important and these do not change materially with angle of turn. Accordingly, the present invention contemplates the actuation of the crossshaft 12 directly by means of a power cylinder 14, through the pin 18 by means of a connecting link 25. Although the link 18 moves in an arc rather than in a straight line, nevertheless the slight variation in effective lever arm between the power application point at pin 18 and the axis 22 of the shaft 12 does not provide a noticeable effect since the pitman arm-drag link connection swings through a similar arc.

Control of the motor 14 is accomplished by means of a reciprocating spool valve 26 axially fixedly carried on the steering shaft 11 but rotatable relative thereto. The connection between the members 11, 15 and 26 may be accomplished in numerous manners but one very satisfactory connection is illustrated in Figure 2. There, the shaft 11 is axially splined at 11a to stub shaft 15a integral with the worm 15. The shafts 11 and 15a are further secured by means of a collar 11b and pins 11c such that the spool valve 26 is axially restrained between the abutment shoulder 11d on the collar 11b and the abutment 15b. In the modification shown in Figure 2, cylindrical needle bearings 27 are provided between the collar 11b and the housing 10 to permit reciprocation and rotation of the elements 11 and 15. In order to minimize wear, the spool 26 preferably does not rotate. In practice this rotation is prevented by friction at the O-rings 26a.

Contrary to conventional practice, the worm 15 of the present invention is a high lead screw. Thus, it is desired that the lead of the worm approximate 1½ to 2 inches per revolution in contrast to the conventional lead of approximately ½ inch per revolution. This is desirable in the present instance since a substantial reduction is provided by the pin and slot construction above disclosed, when the parts are in the straight ahead position. Accordingly, with a high lead worm the present steering apparatus provides a steering ratio approximately that normally provided in manually steered vehicles, at least for a small degree of turn to either side of the straight ahead position.

The use of a high lead arm has an important advantage, aside from its function described above, in that it causes substantially greater reciprocation of the shaft 15a for a given angular rotation of the steering shaft when worm wheel is stationary. Thus, while the ordinary worm lead of approximately ½ inch per turn will cause reciprocation of the steering shaft, assuming the steering shaft to be reciprocable for valve operations, of only a few thousands of an inch, a high lead worm having a lead approximately three times that of the conventional systems causes approximately three times the reciprocal movement of the shaft 15a for the same degree of shaft rotation when the worm wheel is stationary from the effects of the load (this relative movement between the steering shaft and worm wheel is conventionally termed steering shaft valve actuation "lost motion"). The net result of this increase in reciprocal movement with rotation of the steering shaft 11 is to permit substantially wider manufacturing tolerances in the spool valve. This is, of course, a very substantial improvement in and of itself since it is desired that power steering systems be made as cheaply as possible in order to provide them for the less expensive automobiles.

The spool valve 26 is preferably of the continuous flow type and is provided with a pump high pressure groove 28, a pair of spaced lands 29 and 30 on either side of the groove 28 and a pair of low pressure discharge grooves 31 and 32 on opposite sides of the lands 29 and 30. The housing 10 is provided with a pair of cooperating annular grooves 33 and 34 which lead to opposite sides of the power piston to be described below via conduits 33c and 34c respectively, and a high pressure inlet 28c. The valve grooves 31 and 32 lead to the fluid pressure pump reservoir via any conventional conduit connections.

The valve lands 29 and 30 are of a width slightly less than the width of the cooperating grooves 33 and 34 in the housing 10. Accordingly, in the centered, valve neutral or open position, fluid under pressure from the pump or other source flows from the groove 28 into the grooves 33 and 34, thence into the grooves 31 and 32, to the pump inlet. This path is shown by the arrows 36 in Figure 2. Upon reciprocation of the shaft 15a to the left as a result of reaction of the worm 15 on the worm wheel 13, the groove 31 is closed off from the groove 33 by the land 29 and at the same time the groove 34 is closed off from the groove 28 by the land 30. Accordingly, fluid moves from the groove 28 to the groove 33 where it builds up pressure and operates the power cylinder 14. Movement of the shaft 15a toward the right conversely blocks the connection between the grooves 32 and 34, opens the connection between the grooves 28 and 34 wider, and closes the connection between the grooves 28 and 33 thereby causing an application of fluid pressure in the groove 34 and in the power steering cylinder 14 in a direction opposite to that applied when the pressure is in groove 33.

The valve spool 26 is normally maintained in its centered, or valve-neutral position by a novel slack-free spring assembly generally indicated at 37 in Figure 2. As there shown, the worm 15 is provided with an end stub shaft 15c upon which the internal races 38 and 39 of a pair of tapered roller bearings are mounted. The external races 40 and 41 of the respective bearings are provided with peripherally projecting flanges 42 and 43 which cooperate with the inside peripheral edge of respective Belleville washers 44 and 45. The compressing action of the springs provides automatic wear take up, thereby eliminating slack. At the same time frictional resistance to reciprocation of the shaft 15 is minimized since no sliding friction is introduced at the main load carrying bearings 38, 39. Instead, the springs 44, 45 merely rock to permit reciprocation of the shaft 15.

A cylindrical sleeve 46 is provided at the outer periphery of the springs 44 and 45 for preventing inadvertent excessive compression and an adjusting shim 47 is provided between the chamfered shoulder 48 on the housing 11 and the Belleville spring washer 44. An adjusting cap 49 is threadedly engaged with the threaded bore 50 in the housing 10 and is sealed therewith by means of an O-ring 51. As may be seen from Figure 2, the internal edge 52 of the cap 49 is chamfered to provide a projecting portion 53 which engages the Belleville spring washer 45 at its outer peripheral edge. By rotating the cap 49 inwardly the springs 44 and 45 are caused to assume oppositely dished shapes as shown in Figure 2, in which the springs are equally loaded but in which no overall pre-load is applied to the valve spool.

Before assembly, the springs 44 and 45 are flat and are of a substantially uniform spring rate. As will be apparent, adjustment of the cap 49 will cause the springs 44 and 45 to assume a greater and greater dished shape as the cap 49 is moved toward the left in Figure 2. At the same time, the neutral position of the shaft 15 relative to the springs is moved to the left a distance equal to half the distance through which the cap 49 moves. Accordingly, by adjusting the cap 49 the exact position of the shaft 15a and spool valve 26 may be adjusted to thereby center the spool 26 relative to the grooves 33 and 34.

For adjustment purposes the shim 47 may be varied in thickness thereby providing an additional adjustment feature where it is desired to move the shaft 15a and the spool 26 toward the right to its desired neutral condition. In ordinary operation it is intended that the springs be compressed sufficiently to prevent the return of either spring to a flat unstressed condition during valve travel. This travel is in the order of .012 inch in the present invention as compared with only approximately .003 in most prior low lead steering gear valves.

Figure 7:
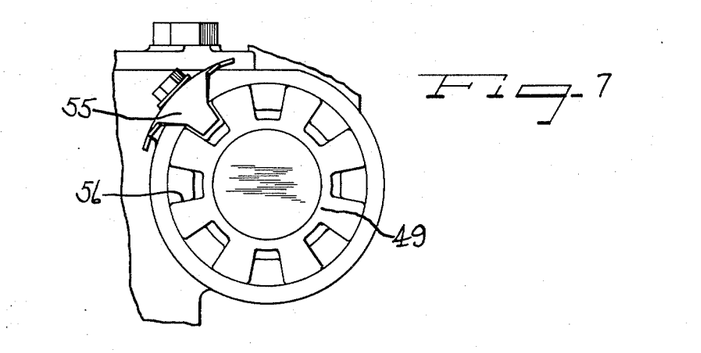
Figure 7 is a partial view in end elevation of the adjusting appartus for adjusting the valve centering springs of the present invention.

Adjustment of the cap 49 must be exact in order to provide exactly centered valve elements and accordingly an infinite adjustment lock is provided. This may be seen from consideration of Figures 2 and 7 wherein a locking clip 55 is shown projecting into one of a plurality of equally spaced recesses 56 in the periphery of the cap 49. The clip 55 is provided with a slot 57 and a locking screw 58. Accordingly, in order to adjust the cap 49, the cap is rotated into its final adjusted position, and the clip 55 is positioned to the slot 56 closest to the radial hole into which the locking screw 58 is positioned. The slot 57 is long enough to overlap the distance between slots 56 and accordingly the screw 58 may be positioned in its aperture and tightened down against the clip 55 in any position of the cap 49. This adjustment permits a simple, final, accurate centering of the steering after the automobile has been assembled.

As discussed above, the power cylinder 14 rotates the pitman shaft 12 by means of a connecting link 25 secured to pin 18 on the crank arm 19. As may be seen from a consideration of Figure 3, the connecting link 25 is connected at its opposite ends by means of a forked member 59 and pin 59a secured by means of a nut 60 to the power cylinder piston 61. The forked member 59 carries a piston tube 62 which is slidably mounted in the sealing sleeve 63 thereby permitting reciprocation of the piston 61 and the pivotal connection between the piston and the link 25 while at the same time providing a complete seal between the power cylinder 14 and the remainder of the power steering apparatus.

The power steering structure as so far described operates to provide an increasing resistance to steering effort through the critical range of automotive vehicle driving. This may be understood from a consideration of Figure 4 wherein a graph illustrating different types of power steering systems is shown. As may be seen, the chart plots the input torque at the steering wheel against the output torque, or steering load of the device. Ordinarily, in power steering systems it is desired that some maximum value of input torque, such as X corresponding to about 5 to 7 pounds effort at the steering wheel rim be required to provide some maximum output torque value indicated at Y. Although all known commercial power steering systems operate on this basis, the input torque-output torque curves are extremely varied.

Figure 4:
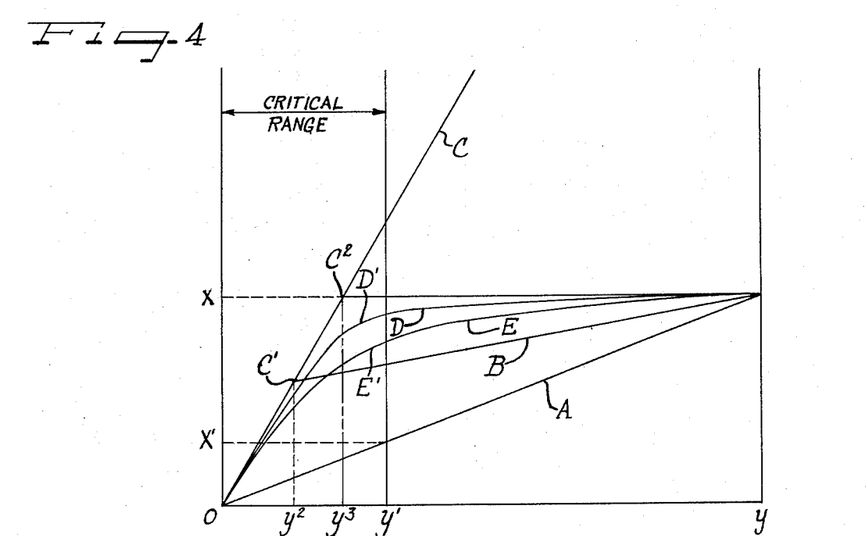
Figure 4 is a graph illustrating the operation of the power steering system of the present invention.

For example, in some systems full time power steering is provided. In such systems a power boost is provided at all times, even at very low steering loads. The input torque-output torque curve of such a system is illustrated at line A. The difficulty with such an arrangement is, however, that in the "critical" or highway driving range of vehicle steering which lies between O and Y', the input torque increases only to the relatively small value of X' throughout the entire critical range. Accordingly, the sensitivity or feel-back received by the driver varies only a small amount through the entire critical range and it has been found that in such systems most drivers consider the feel insufficient to provide confident control.

As an alternative to the full time power steering system above described, many systems provide a power steering boost operating above a threshold point and having a hydraulic feel-back operating at all points above the threshold point. Such a system is graphically illustrated at line B. Such systems incorporate preloaded springs or similar devices to prevent power boost until an output torque of $Y^2$ is reached. This point on the manual steering curve, C, is indicated at C' and is termed the threshold point. At this point power steering comes into play and as in the case of the full time power steering indicated at line A, the line B continues from the point C' progressively upwardly at a substantially constant rate to the point X, Y. The major difficulty with such systems is that in practice it has been found that the threshold point C' is very sharp and is right in the middle of the critical range thereby confusing the average driver by providing a sharp transition which may consequently prevent him from sensing accurately changes in steering load adjacent and above the threshold point.

Another system which is not, according to my knowledge, now commercially employed would eliminate fluid achieved feel-back and provide a threshold point $C^2$ at an output torque value of $Y^3$ and an input torque value of X. Under such a system the resistance to steering effort would increase up to the threshold point and would then remain substantially constant independently of added output torques or steering loads. Under such a system, the threshold point $C^2$ would lie in the critical range and would provide an abrupt change in the middle of the ordinary valve operation. However, such a system has an advantage in that it does not incorporate any of the relatively complex and expensive means of providing fluid feel-back commonly employed in modern commercial power steering systems.

The power steering system and apparatus described to this point in the present application provides a still different characteristic line D having no threshold point. Instead of parting from the manual steering line C sharply at a threshold point power boost is applied gradually from the beginning, as shown in line D, rapidly approaching and substantially reaching the maximum input torque value X at a point slightly beyond the end of the critical range. This relatively smooth curve is caused, in the present apparatus, by the combination of several factors. The first of these is the fact that the worm 15 has a high lead and the valve core 26 accordingly is permitted to reciprocate a relatively large distance before the full power position is achieved. Accordingly, from the position in which no power is built up, to the position in which almost full power is built up, there will be a gradual build up. This gradual build up is not present in most of the earlier systems as above described because of the relatively low worm lead and resulting relatively sharp valve action between the no power and full power positions.

The second factor which constributes to provide the relatively smooth curve D is the novel action of the springs 44, 45. As a result of the balanced opposition of the springs 44, 45, a neutral condition in which no preload exists is provided.

As will be apparent the spring rate of the pair of springs 44, 45 will be twice the rate of only one of them alone, during the range of operation in which one spring is flattening and the other is becoming increasingly curved. Relatively high rate springs are utilized and it is preferred that from the valve neutral position in which no spring load is present, to the fully operative position a high spring load be added. For example, with the high lead worm it has been found satisfactory to provide springs giving a load of approximately 90 pounds at the fully operative position. This range of operation is different from the conventional low lead worm and preloaded spring system having a threshold point and which has a low rate spring with a preloaded central condition of approximately 300 pounds and a valve operative load of about 320 pounds. In the latter system little additional feel or resistance to valve operation occurs from the springs during the valve operating range and instead fluid feel-back is the dominant control force while in the former the spring provides the feel.

A third factor influencing the curve D is the fact that the pressure build up, and hence the power output, caused by valve movement from neutral to the fully operative position increases generally as the square of the valve movement where the valve lands and grooves are planar. Accordingly as the steering load increases and the springs are increasingly deflected the pressure build up or output torque begins to increase at a great rate with relatively less incremental valve movement. This may be seen from the graph where the line D shows a smooth, but fast, drop off in increments of input torque requirement for additional output torque beyond the critical driving range As a result of the combination of the relatively large spool movement provided by the high lead worm, the high rate springs which provide a substantial resistance to valve movement during the operative range of the valve, and the square law valve operation, a gradual transition occurs in the general area D′ of the curve D. Thus, with the planar valve so far described, an increasing feel is provided to the driver without the need for complex hydraulic feel-back systems. However, outside the critical driving range, substantially the maximum power boost is provided at all times. Accordingly, during most parking operations where accurate feel is not needed, the maximum boost is provided and changes in feel are at a minimum. During normal driving, however, a fairly steep input torque-output torque curve, which follows rather closely for the most part the manual curve C, is provided, thereby providing a maximum in feel-back during the normal driving situation. The transition D′ has been found, on the curve D, to occur without a noticeable abruptness and accordingly, the power steering system here described has proven superior to systems having an operational curve such as B.

An improved valve operation, however, is preferably provided. This modified valve provides a curve indicated at E and as may be seen, the curve E is similar to the curve D except that it departs from the manual curve C more rapidly and approaches the maximum input torque X less rapidly. As a result, the input torque of this modified system smoothly increases with output torque until it substantially reaches maximum input torque well outside the driving critical range.

Figure 8:
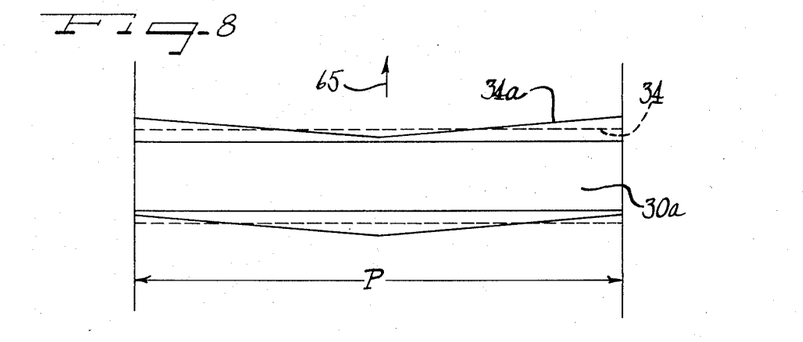
Figure 8 is a diagrammatic illustration of the valve operation according to a first modified form of the valve of the present invention.

The curve E is achieved through the factors described above relative to the planar valve through a valve structure diagrammatically shown in Figure 8. As may there be seen, a valve land, for example, 30a is shown with its periphery laid out in a developed view, the peripheral dimension being shown as dimension P. The corresponding planar valve housing groove 34 is likewise shown in developed view. However, in order to achieve the modified curve E, the groove 34 is machined at an angle, as indicated at 34a. As a result of this groove construction, the land 30a when moving in the direction indicated by arrow 65 will intercept the groove edge 34a prior to the time it would ordinarily have intercepted the groove edge 34 and will completely close off the groove 34a at a point later than it would have completely closed off the groove 34. This provides a more gradual pressure build up in the power cylinder, which has the effect of providing a larger and more gradually curved portion E on the curve E′ than takes place at D′ on curve D.

Figure 9:
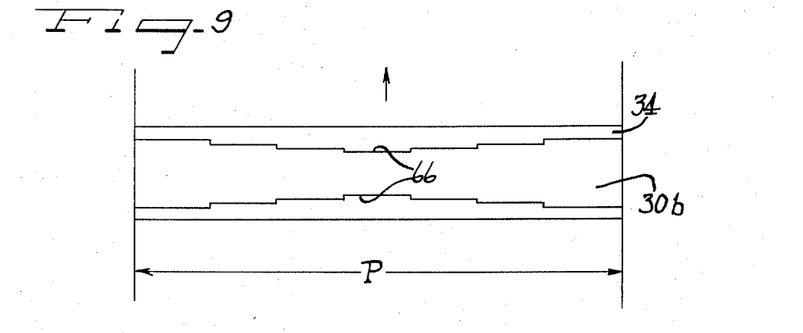
Figure 9 is still a further modified form of valve adapted for use in the structure of the present invention.

The more gradual application of power may also be achieved by machining the lands of the valve spool 26 instead of the grooves in the housing 11. This arrangement is shown in Figure 9 wherein the land 30b is shown positioned relative to the groove 34. As may be seen, the land 30b is provided with a plurality of progressively reduced notches 66 which cause the land 30b to intercept the edge of the groove 34 more gradually than in the conventional straight annular groove and land valve combination. It will, of course, be understood that the machining of the grooves 34a or the land 30b may be varied slightly to provide different pressure build up characteristics without departing from the scope of the present invention. Such modifications may vary with the variations in the critical steering range, or in other words that range of steering in which the vehicle is ordinarily operated on the highway as distinguished from the range of operation in parking where extremely heavy loads are involved, which would occur with changes in steering linkage, weight distribution, and so forth.

Also, it will be understood that a slight pre-load could be used so that the curve D or E would follow the curve C a short distance. In view of the step slope of curves D and E at the start, such a pre-load would not be unduly objectionable as in curves A and B where the slopes are small.

Figure 5:
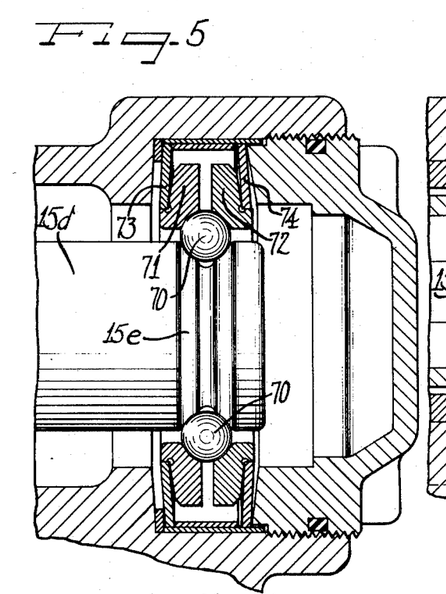
Figure 5 is a partial view of a modified form of valve centering bearing system constructed in accordance with the present invention.
Figure 6:
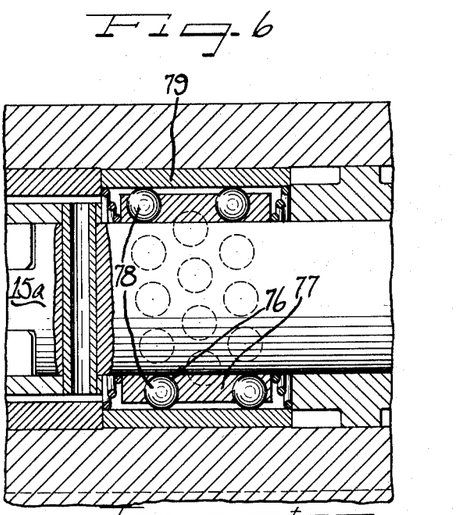
Figure 6 is a modified bearing arrangement for incorporation into the valve of the present invention.

In Figures 5 and 6 I have illustrated modified forms of bearings for use with the worm shaft 15. As shown in Figure 5, the worm 15d is provided with an integrally machined race 15e at its right hand extremity. A plurality of balls 70 are positioned in the race 15e and are maintained therein by a pair of outer races 71 and 72 which are in turn urged toward each other and against the balls 70 by means of the Belleville spring washers 73 and 74, respectively. As in the case of the modification shown in Figures 1, 2 and 3, the springs 73 and 74 are initially flat but are stressed into the dished shape shown in Figure 5 by means of the adjusting cap 49. As will be apparent, the modified form shown in Figure 5 functions in the same manner as that shown in Figure 2 but is of substantially simpler construction and will accordingly aid in reducing the cost of the piston power steering system for use with expensive vehicles.

In Figure 6 a modified form of power steering valve bearing is illustrated. As there shown, a bearing generally indicated at 76 is substituted for the needle bearings 27 shown in Figure 2. However, instead of the usual needle bearing, the bearing 76 comprises a ball retaining sleeve 77 having a plurality of balls 78 loosely embedded therein along a generally helical path. The balls 78 are in direct contact with the shaft 15a and also with the external race 79 positioned in the housing 10. As a result of the rolling contact between the race 79 and the shaft 15a, the shaft 15a is permitted to reciprocate or rotate freely. By providing the balls 78 in relatively large numbers and along a helical path, the points of contact between the balls and the shaft and race are constantly changing and accordingly no grooves are worn into the shaft 15a. This is extremely important in power steering operation of the type herein contemplated since any grooves appearing in the shaft 15a will cause abrupt actuation of the valve and result in jerky power steering movements. It will be understood, of course, that the balls 78 need not be positioned in a helical path but, instead, may be provided in any random pattern, the helical path being chosen because of its use of a maximum number of balls in a minimum space.

It will thus be seen that I have provided a novel, simple, and extremely compact power steering apparatus providing desirable feel-back characteristics and having a relatively high steering ratio in the vehicle-straight-ahead condition while at the same time providing an unusually low number of steering wheel turns for lock to lock steering operation. It will, of course, be apparent that variations and modifications other than those illustrated above, may be incorporated in the structures herein illustrated without departing from the scope of the novel concepts of the present invention. It is, accordingly, my intention that the present invention be limited solely by the scope of the appended claims.

I claim as my invention:

1. In combination in a vehicle having steered wheels, a steering system comprising a steering shaft, an output shaft in steering connection with said wheels, an intermediate element having a rotatable connection with said steering shaft, a crank arm secured to said output shaft for rotation thereof, a pin on said arm extending into a radial slot in said element, the distance between the axis of said pin and the axis of said intermediate element being at a minimum when the vehicle is in a straight ahead condition, means for applying a power boost to said wheels, means connecting said last named means to a point in the system between said slot and said wheels, means mounting said steering shaft for reciprocation and rotation and control means for controlling the application of said power boost means and connected to said steering shaft for reciprocation therewith, the reaction of said rotatable connection operating to reciprocate said steering shaft upon resistance of said intermediate member to rotation to thereby actuate said control means to apply said power boost when said resistance increases.

2. In combination in a power steering system for vehicles, a steering shaft, an output shaft, an intermediate element having a gear reduction connection with said steering shaft, a crank arm secured to said output shaft for rotation thereof, a pin on said arm extending into a radial slot in said element, the distance between the axis of said pin and the axis of said intermediate element being a minimum when the vehicle is in the straight ahead condition, means for applying a power boost to said output shaft, said means being constructed to apply power at a point in the system between said slot and the end of said output shaft opposite therefrom, means mounting said steering shaft for reciprocation and rotation and permitting reciprocation in opposite directions from a central neutral position upon the application of steering torque to said shaft, control means for controlling the application of said power boost and connected to said steering shaft for reciprocation therewith and for actuatiton of said power boost means upon reciprocation thereof, the reaction of said gear reduction connection operating to reciprocate said steering shaft upon resistance of said intermediate member to rotation to thereby actuate said control means to apply said power boost, and means centering said steering shaft axially in the axially centered position, said last named means comprising a pair of normally flat Belleville springs having their internal peripheries in rotational but non-reciprocal connection with said shaft and their external peripheries axially confined between a pair of adjustably fixed abutment shoulders.

3. In combination in a power steering system for vehicles, a steering shaft, a valve having a reciprocal spool secured to said steering shaft and having a fixed housing, an output shaft, an intermediate element having a rotational connection with said steering shaft, a crank arm secured to said output shaft for rotation thereof, a pin on said arm extending into a radial slot in said element, the distance between the axis of said pin and the axis of said intermediate element being a minimum when the vehicle is in its straight ahead condition, means for applying a power boost to said output shaft, said means being constructed to apply power at a point in the system between said slot and the end of said output shaft opposite therefrom, means mounting said steering shaft for reciprocation and rotation for controlling the application of said power boost and connected to said steering shaft for reciprocation therewith, the reaction of said rotational connection operating to reciprocate said steering shaft upon resistance of said intermediate member to rotation to thereby reciprocate said steering shaft and said valve spool to apply said power boost, and slack eliminating means centering said steering shaft axially in a central valve-neutral position, said last named means comprising a pair of normally flat Belleville springs having their internal peripheries in rotational but non-reciprocal connection wtih said shaft and their external peripheries confined between a pair of fixably adjusted abutment shoulders, said valve comprising a spool having a plurality of peripheral grooves separated by lands and the spool housing member having a plurality of grooves separated by lands, means positioning the lands of said spool opposite the grooves of said housing in the valve-neutral position, at least one of said lands having less width than its respective groove and having its groove forming faces non-planar in contour whereby reciprocating movement of the spool will cause closure of the space between said one land on one member and an adjacent land on the other member in a gradual manner.

4. A valve having non-hydraulic mechanical feel-back for a power steering system comprising a cylindrical housing member, a valve spool member reciprocable therein, one of said members having a central land separating a pair of grooves and the other of said members having a pair of lands spaced by a groove, said groove and said land forming a fluid pressure inlet chamber and said pair of grooves and said pair of lands forming a pair of fluid pressure outlet chambers, said lands having an axial width less than the width of their respective grooves, at least one of the lands being non-planar whereby the port formed by said last named one land and its respective groove decreases in area at a decreasing rate as the valve spool reciprocates away from a centered position, and non-preloaded spring means providing a linear restoring force comprising essentially the entire restoring force centering said spool in said housing in a centered neutral valve-open position, said spring providing a substantially increasing centering force as the spool moves away from the centered position.

5. In combination in a power steering system for vehicles, a steering shaft, an output shaft, a high lead worm fixed secured to said steering shaft, an intermediate worm wheel element in driven connection with said steering shaft, a crank arm secured to said output shaft for rotation thereof, a pin on said arm extending into a radial slot in said element, the distance between the axis of said pin and the axis of said intermediate worm wheel element being a minimum when the vehicle is in straight ahead position, power boost means, means operatively connecting said power boost means to said output shaft, means mounting said steering shaft for reciprocal movement in response to resistance of said worm wheel element to rotation, reciprocal spool valve means connected to said steering shaft for reciprocation when said steering shaft reciprocates, means connecting said valve to said power boost means for energizing said power boost means upon reciprocation of said valve spool means and balanced, opposed high rate spring centering means associated with said steering shaft for resisting reciprocal movement thereof and applying a large spring centering load to said valve as said valve approaches its operative limits.

6. In combination in a power steering system for vehicles, a steering shaft, an output shaft, a high lead worm fixedly secured to said steering shaft, an intermediate worm wheel element in driven connection with said steering shaft, a crank arm secured to said output shaft for rotation thereof, a pin on said arm extending into a radial slot on the said element, the distance between the axis of said pin and the axis of said intermediate worm wheel element being a minimum when the vehicle is in straight ahead condition, power boost means, means operatively connecting said power boost means to said crank arm, means mounting said steering shaft for reciprocal movement in response to resistance of said worm wheel element to rotation, reciprocal spool valve means connected to said steering shaft for reciprocation when said steering shaft reciprocates, means connecting said valve to said power boost means for energizing said power boost means upon reciprocation of said valve spool means and non-pre-loaded spring centering means associated with said steering shaft for resisting reciprocal movement thereof.

7. In combination in a power steering system for vehicles, a steering shaft, a valve having a reciprocable spool secured to said steering shaft for reciprocation within a fixed housing, an output shaft, an intermediate element having a high lead worm and worm wheel connection with said steering shaft, a crank arm secured to said output shaft for rotation thereof, a pin on said arm extending into a radial slot in said element, the distance between the axis of said pin and the axis of said intermediate element being a minimum when the vehicle is in its straight ahead condition, means for applying a power boost to said output shaft, said means being constructed to apply power at a point in the system between said slot and the end of said output shaft opposite therefrom, means mounting said steering shaft for reciprocation and rotation, said worm and worm wheel connection causing reaction for reciprocating said steering shaft upon resistance of said intermediate member to rotation to thereby actuate said valve spool to energize said power boost means and slack eliminating means centering said steering shaft axially in a central valve-neutral position, said last named means comprising a pair of normally flat Belleville springs having their internal peripheries in rotational but non-reciprocal connection with said shaft and their external peripheries confined between a pair of fixably adjusted abutment shoulders, said valve spool member having a plurality of peripheral grooves separated by lands and said fixed housing member having a plurality of grooves separated by lands, means positioning the lands of said spool opposite the grooves of said housing in the valve-neutral position, at least one of said lands having less width than its respective groove and having its groove forming faces non-planar in contour whereby reciprocating movement of the spool will cause closure of the space between said one land on one member and an adjacent land on the other member in a gradual manner.

8. In combination in a power steering system for vehicles, a steering shaft, a valve having a reciprocable spool secured to said steering shaft for reciprocation within a fixed housing, an output shaft, an intermediate element having a high lead worm and worm wheel connection with said steering shaft, a crank arm secured to said output shaft for rotation thereof, a pin on said arm extending into a radial slot in said element, the distance between the axis of said pin and the axis of said intermediate element being a minimum when the vehicle is in its straight ahead condition, means for applying a power boost to said output shaft, said means being constructed to apply power at a point in the system between said slot and the end of said output shaft opposite therefrom, means mounting said steering shaft for reciprocation and rotation, said worm and worm wheel connection causing reaction for reciprocating said steering shaft upon resistance of said intermediate member to rotation to thereby actuate said valve to apply said power boost and slack eliminating means centering said steering shaft axially in a central valve-neutral position, said last named means comprising a pair of normally flat high rate Belleville springs having their internal peripheries in rotational but non-reciprocal connection with said shaft and their external peripheries confined between a pair of fixably adjusted abutment shoulders, said valve spool member having a plurality of peripheral grooves separated by lands and said fixed housing member having a plurality of grooves separated by lands, means positioning the lands of said spool opposite the grooves of said housing in the valve-neutral position, at least one of said lands having less width than its respective groove and having its groove forming faces non-planar in contour whereby reciprocating movement of the spool will cause closure of the space between said one land on one member and an adjacent land on the other member in a gradual manner.

9. In combination in a power steering system for vehicles, a steering shaft, a valve having a reciprocal spool secured to said steering shaft for reciprocation within a fixed housing, an output shaft, an intermediate element having a high lead worm and worm wheel connection with said steering shaft, a crank arm secured to said output shaft for rotation thereof, a pin on said arm extending into a radial slot in said element, the distance between the axis of said pin and the axis of said intermediate element being a minimum when the vehicle is in its straight ahead condition, means for applying a power boost to said output shaft, said means being constructed to apply power at a point in the system between said slot and the end of said output shaft opposite therefrom, means mounting said steering shaft for reciprocation and rotation, said worm and worm wheel connection causing reaction for reciprocating said steering shaft upon resistance of said intermediate member to rotation to thereby actuate said valve to apply said power boost and slack eliminating means centering said steering shaft axially in the valve-neutral position, said last named means comprising a pair of normally flat Belleville springs having their internal peripheries in rotational but non-reciprocal connection with said shaft and their external peripheries confined between a pair of fixably adjusted abutment shoulders, said Belleville springs having a high spring rate and a deflection load at the extreme position of the valve spool away from the central position several times that at the central position, said valve spool member having a plurality of peripheral grooves separated by lands and said fixed housing member having a connection with said shaft and their external peripheries confined between a pair of fixably adjusted abutment shoulders, means positioning the lands of said spool opposite the grooves of said housing in the central valve-neutral position, at least one of said lands having less width than its respective groove and having its groove forming faces non-planar in contour whereby reciprocating movement of the spool will cause closure of the space between said one land on one member and an adjacent land on the other member in a gradual manner.

10. In combination in a power steering system for vehicles, a steering shaft, an output shaft, a high lead worm fixedly secured to said steering shaft, an intermediate worm wheel element in driven connection with said steering shaft, a crank arm secured to said output shaft for rotation thereof, a pin on said arm extending into a radial slot on the said element, the distance between the axis of said pin and the axis of said intermediate worm wheel element being a minimum when the vehicle is in straight ahead condition, power boost means, means operatively connecting said power boost means to said crank arm, means mounting said steering shaft for reciprocal movement in response to resistance of said worm wheel element to rotation, reciprocal power boost control means operatively connected to said steering shaft for reciprocation when said steering shaft reciprocates, and non-pre-loaded spring centering means associated with said steering shaft for resisting reciprocal movement thereof said centering means comprising a pair of high rate opposed initially stressed springs.

11. In combination in a power steering system for vehicles, a steering shaft, an output shaft, a high lead worm fixedly secured to said steering shaft, an intermediate worm wheel element in driven connection with said steering shaft, a crank arm secured to said output shaft for rotation thereof, a pin on said arm extending into a radial slot on the said element, the distance between the axis of said pin and the axis of said intermediate worm wheel element being a minimum when the vehicle is in straight ahead condition, power boost means, means operatively connecting said power boost means to said crank arm, means mounting said steering shaft for reciprocal movement in response to resistance of said worm wheel element to rotation, reciprocal power boost control means operatively connected to said steering shaft for reciprocation when said steering shaft reciprocates, and non-pre-loaded spring centering means associated with said steering shaft for resisting reciprocal movement thereof, said centering means comprising a pair of high rate opposed initially stressed Belleville springs having their outer peripheries fixed and their inner peripheries operatively axially secured to said steering shaft whereby axial movement of said shaft causes deflection of said springs without sliding friction.

12. In combination in a power steering system for vehicles, a steering shaft, a valve having a reciprocable spool secured to said steering shaft for reciprocation within a fixed housing, an output shaft, an intermediate element having a gear reduction connection with said steering shaft, a crank arm secured to said output shaft for rotation thereof, a pin on said arm extending into a radial slot in said element, the distance between the axis of said pin and the axis of said intermediate element being a minimum when the vehicle is in the straight ahead condition, means for applying a power boost to said output shaft, said means being constructed to apply power at a point in the system between said slot and the end of said output shaft opposite therefrom, means mounting said steering shaft for reciprocation and rotation for controlling the application of said power boost and connected to said steering shaft for reciprocation therewith, the reaction of said gear reduction connection operating to reciprocate said steering shaft upon resistance of said intermediate member to rotation to thereby actuate said valve to apply said power boost, and means centering said steering shaft axially in a central valve-neutral position, said last named means comprising a pair of normally flat Belleville springs having their internal peripheries in rotational but non-reciprocal connection with said shaft and their external peripheries confined between a pair of adjustably fixed abutment shoulders said means mounting said steering shaft for reciprocation including anti-friction bearings on said steering shaft remote from said springs.

13. In combination in a power steering system for vehicles, a steering shaft, a valve having a reciprocable spool secured to said steering shaft for reciprocation within a fixed housing, an output shaft, an intermediate element having a gear reduction connection with said steering shaft, a crank arm secured to said output shaft for rotation thereof, a pin on said arm extending into a radial slot in said element, the distance between the axis of said pin and the axis of said intermediate element being a minimum when the vehicle is in the straight ahead condition, means for applying a power boost to said output shaft, said means being constructed to apply power at a point in the system between said slot and the end of said output shaft opposite therefrom, means mounting said steering shaft for reciprocation and rotation for controlling the application of said power boost and connected to said steering shaft for reciprocation therewith, the reaction of said gear reduction connection operating to reciprocate said steering shaft upon resistance of said intermediate member to rotation to thereby actuate said valve to apply said power boost, and means centering said steering shaft axially in a central valve-neutral position, said last named means comprising a pair of normally flat Belleville springs having their internal peripheries in rotational but non-reciprocal connection with said shaft and their external peripheries confined between a pair of adjustably fixed abutment shoulders said means mounting said steering shaft for reciprocation including anti-friction bearings on said steering shaft remote from said springs and said anti-friction bearings comprising a plurality of ball bearings carried loosely in an axially staggered manner by a cylindrical element having axially staggered radially extending ball carrying apertures.

14. A non-hydraulic mechanical feel-back valve for a power steering system comprising a cylindrical housing member, a valve spool member reciprocable therein, one of said members having a central annular land separating a pair of grooves and the other of said members having a pair of annular lands spaced by a groove, said groove and said land forming a fluid pressure inlet chamber and said pair of grooves and said pair of lands forming a pair of fluid pressure outlet chambers, said lands having an axial width less than the width of their respective grooves and having a tapered configuration providing a reducing rate of flow cut-off per unit of valve member travel as the valve lands move to flow cut-off non-centered condition whereby the ports formed by said lands and their respective grooves change in area at a smoothly reducing rate as the valve spool reciprocates away from a central neutral position to an extreme fully operative position in which one of said pair of grooves is fully open to said groove, and non-pre-loaded spring means providing a linear resilient restoring force comprising essentially the entire restoring force acting to center said spool in said housing in a neutral valve-open position, said non-preloaded spring means providing a linear restoring force having a high spring rate whereby the centering force exerted by said spring means increases through a substantial range on movement of said valve from said valve neutral to valve operative positions.

15. A non-hydraulic feel-back valve for a power steering system comprising a cylindrical housing member, a valve spool member reciprocable therein, one of said members having a central annular land separating a pair of grooves and the other of said members having a pair of annular lands spaced by a groove, said groove and said land forming a fluid pressure inlet chamber and said pair of grooves and said pair of lands forming a pair of fluid pressure outlet chambers, said lands having an axial width less than the width of their respective grooves and having a tapered configuration providing a reducing rate of flow cut-off per unit of valve member travel as the valve lands move to flow cut-off non-centered condition whereby the ports formed by said lands and their respective grooves change in area at a decreasing rate as the valve spool reciprocates away from a central neutral position to an extreme fully operative position in which one of said pair of grooves is fully open to said groove, and non-pre-loaded spring means providing a linear resilient restoring force comprising essentially the entire restoring force acting to center said spool in said housing in a neutral valve-open position, said spring means comprising a pair of opposed Belleville springs having a high spring rate whereby the centering force exerted by said spring means increases through a substantial range on movement of said valve from said valve neutral to valve operative positions.

16. A power steering control valve providing mechanical non-hydraulic "feel-back" comprising a cylindrical housing member, a valve member movable therein, one of said members having a raised land thereon separating a pair of grooves and the other of said members having a pair of raised lands spaced by a groove, said first named land and last named groove forming a fluid pressure inlet chamber and said pair of grooves and said pair of lands forming a pair of fluid pressure outlet chambers, said lands having a width less than the width of their respective grooves and having a tapered configuration providing a reducing rate of flow cut-off per unit of valve member travel as the valve lands move to flow cut-off non-centered condition and non-preloaded spring means providing a linear restoring force to center said valve member in said housing in a neutral valve-open position, said spring means having a high spring rate and applying essentially the entire force acting to urge the valve to centered condition, which force is proportional to the amount of movement of the valve away from centered condition, whereby the centering force exerted by said spring means increases through a range starting at zero at the valve neutral position to a substantial force at the valve operative position.

17. A power steering control valve providing non-hydraulic mechanical "feel-back" comprising a cylindrical housing member, a movable valve member movable therein, one of said members having a raised land thereon separating a pair of grooves and the other of said members having a pair of raised lands spaced by a groove, said first named land and last named groove forming a fluid pressure inlet chamber and said pair of grooves and said pair of lands forming a pair of fluid pressure outlet chambers, said lands having a width less than the width of their respective grooves whereby the ports formed by said lands and their respective grooves change in area as the valve spool moves away from a central, neutral position to an extreme fully operative position in which one of said pair of grooves is fully open to said groove and non-preloaded spring means providing a linear restoring force comprising essentially the entire force acting to center said valve member in said housing in a neutral valve-open position, said spring means having a high spring rate whereby the centering force exerted by said spring means increases through a range starting at zero at the valve neutral position to a substantial force at the valve operative position, and said lands being non-planar in configuration relative to said grooves to provide, in combination with said linear high spring rate springs, a decreasing flow area which decreases rapidly at first and thereafter decreases less rapidly as said valve land closes its respective port in combination with the land on said housing member.

18. A power steering control valve providing non-hydraulic mechanical "feel-back" comprising a cylindrical housing member, a movable valve member movable therein, one of said members having a raised land thereon separating a pair of grooves and the other of said members having a pair of raised lands spaced by a groove, said first named land and last named groove forming a fluid pressure inlet chamber and said pair of fluid pressure outlet chambers, said lands having a width less than the width of their respective grooves and having a tapered configuration relative to their respective grooves providing a reducing rate of flow area decrease per unit of valve member travel as the valve lands move to flow cut-off non-centered condition, and non-preloaded spring means providing a linear restoring force comprising essentially the entire restoring force acting to center said valve member in said housing in a neutral valve-open position, said spring means having a high spring rate applying a substantial resistance to movement of said valve away from centered position to thereby provide feel, which resistance is proportional to the distance moved and increases from a value of zero at the said centered position.

19. A variable ratio power steering system comprising a steering shaft member and a steering output member connected to dirigible vehicle wheels, comprising a variable ratio connection between said members including means providing a high ratio connection between said members when said members are in a neutral mid-point vehicle-straight-ahead relation, said means providing a substantially lower ratio at points of maximum movement of said steering output member away from said neutral relation and providing a rapid rate of decrease in ratio near said mid-point, power boost means having its output connected into said system to actuate said dirigible wheels in response to steering loads, said power boost means having its output connected into said system at a point between said variable ratio connection and said dirigible wheels to transmit power from said power boost means to said dirigible wheels independently of said variable ratio connection, mechanical feel-back valve means for energizing said power boost means, actuating means for operating said valve, non-preloaded high rate spring means providing a restoring force to center said valve and supplying essentially the entire force acting to center said valve, a limited relative movement connection between said steering shaft and said variable ratio connection, and means responsive to relative movement in said connection in response to a steering load applied at said steering shaft member against said variable ratio connection to move said actuating means.

References Cited in the file of this patent

UNITED STATES PATENTS

| | | |
|---|---|---|
| 2,314,165 | Scott-Paine | Mar. 15, 1943 |
| 2,410,049 | Davis | Oct. 29, 1946 |
| 2,508,057 | Bishop | May 16, 1950 |
| 2,605,854 | MacDuff | Aug. 5, 1952 |
| 2,682,778 | Creson et al. | July 6, 1954 |
| 2,702,529 | Doerfner | Feb. 22, 1955 |